United States Patent
Pietroni

(10) Patent No.: US 8,449,024 B2
(45) Date of Patent: May 28, 2013

(54) CAR FRAME FEATURING RTM-TECHNOLOGY MODULES OF COMPSITE MATERIAL

(75) Inventor: Veronica Pietroni, Milan (IT)

(73) Assignee: Ferrari S.p.A., Modena (IT)

( * ) Notice: Subject to any disclaimer, the term of this patent is extended or adjusted under 35 U.S.C. 154(b) by 209 days.

(21) Appl. No.: 11/658,292

(22) PCT Filed: Jul. 22, 2005

(86) PCT No.: PCT/IB2005/002394
§ 371 (c)(1),
(2), (4) Date: May 12, 2009

(87) PCT Pub. No.: WO2006/011057
PCT Pub. Date: Feb. 2, 2006

(65) Prior Publication Data
US 2009/0295195 A1   Dec. 3, 2009

(30) Foreign Application Priority Data

Jul. 23, 2004 (IT) .............................. BO2004A0465

(51) Int. Cl.
*B62D 21/00* (2006.01)
(52) U.S. Cl.
USPC ....................................... 296/204
(58) Field of Classification Search
USPC ............ 296/187.01, 193.01, 193.03, 193.04, 296/193.07, 193.09, 203.01, 204, 203.02, 296/205, 96.21, 30, 29, 187.08, 187.09; 49/205
IPC ...................................................... B62D 21/00
See application file for complete search history.

(56) References Cited

U.S. PATENT DOCUMENTS

| | | | |
|---|---|---|---|
| 2,794,672 A | 6/1957 | Burzi | |
| 3,202,451 A * | 8/1965 | Auger et al. | 296/204 |
| 4,887,862 A * | 12/1989 | Bassi | 296/204 |
| 5,885,662 A * | 3/1999 | Gardner, Jr. | 427/426 |
| 5,897,160 A | 4/1999 | Reihl | |
| 6,250,410 B1 | 6/2001 | Balestrini et al. | |
| 6,276,477 B1 * | 8/2001 | Ida | 180/89.1 |
| 6,698,822 B2 * | 3/2004 | Adamski | 296/203.02 |
| 6,705,667 B1 * | 3/2004 | Bartesch et al. | 296/187.01 |
| 2002/0063445 A1 * | 5/2002 | Takeuchi | 296/204 |
| 2003/0034670 A1 | 2/2003 | Adamski | |

FOREIGN PATENT DOCUMENTS

| | | |
|---|---|---|
| DE | 195 31 074 | 9/1996 |
| DE | 9411974 | 11/1996 |
| DE | 10130267 | 1/2003 |
| DE | 20214460 | 3/2004 |
| DE | 10259864 | 7/2004 |
| EP | 0291385 | 11/1988 |
| EP | 0670257 | 9/1995 |
| EP | 1260394 | 11/2002 |
| EP | 1316409 | 6/2003 |
| GB | 2317858 | 4/1998 |
| JP | 2002046552 | 12/2002 |

* cited by examiner

*Primary Examiner* — Glenn Dayoan
*Assistant Examiner* — Sunsurraye Westbrook
(74) *Attorney, Agent, or Firm* — John A. Artz; Dickinson Wright PLLC

(57) ABSTRACT

A car frame having a central body, which defines the passenger compartment of the car and is defined by a number of metal parts welded to one another. A monolithic front body is bolted to the central body and is made of composite material fibre using RTM technology. A monolithic floor panel is also connected to the central body and is made of composite material fibre using RTM technology.

14 Claims, 4 Drawing Sheets

CAR FRAME FEATURING RTM-TECHNOLOGY MODULES OF COMPSITE MATERIAL

TECHNICAL FIELD

The present invention relates to a vehicle frame, and more particularly an automobile frame made with composite materials.

BACKGROUND OF THE INVENTION

A mass-produced car frame is normally made of metal (steel or aluminum). To improve the mechanical characteristics and reduce the weight of racing cars, frames made of composite material (typically carbon or Keviar® which is a registered trademark of DuPont for a para-aramid synthetic) fibre having been introduced, the commonest of which substantially comprises a single monolithic body made of hand-laminated carbon and/or Kevlar fibre.

A mass-produced car frame of composite material normally comprises a central body defining the passenger compartment, made of hand-laminated carbon and/or Keylar®. fibre, and to which are bolted a front and rear body also made of hand-laminated carbon and/or Kevlar® fibre. This solution is selected to simplify and reduce the cost of repairing the ear in the event of an accident. Composite materials, in fact, are difficult to repair, especially in other than specialized workshops, and, when damaged, are preferably replaced. An example of a car frame made entirely of composite material is described in Patent Application GB-2317858-A.

Frames made of composite material fibre have better mechanical characteristics and are lighter than metal frames, but are much more expensive and take much longer to produce. This is the reason in the case of road vehicles, that composite material fibre frames are currently limited to high-performance cars produced in very small numbers (at most one or two cars a day).

In the case of mass-produced vehicles, only single parts made of composite material fibre have so far been proposed, as described for example in Patent Application EP-1316409-A1, which relates to a truncated-cone-shaped insert for gradually absorbing the energy of a head-on collision. Another example of a car featuring a front insert of composite material for gradually absorbing the energy of a head-on collision is described in U.S. Pat. No. 6,698,822-B1.

EP-0291385-A1 discloses a modular structure for a vehicle comprising a front module which is simultaneously load-bearing in order to receive stresses and loads, and supporting in order to receive sub-assemblies and their accessories, a central module for absorbing substantial shocks, and a rear module formed from two side rails with a J-shaped horizontal profile.

SUMMARY OF THE INVENTION

It is an object of the present invention to provide an improved a car frame having portions with composite materials which is less expensive and easier to produce, than existing car frames having portions of composite materials while at the same time eliminating the aforementioned drawbacks.

According to the present invention, there is provided a car frame which meets this objective and which is disclosed in the accompanying description and drawings.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
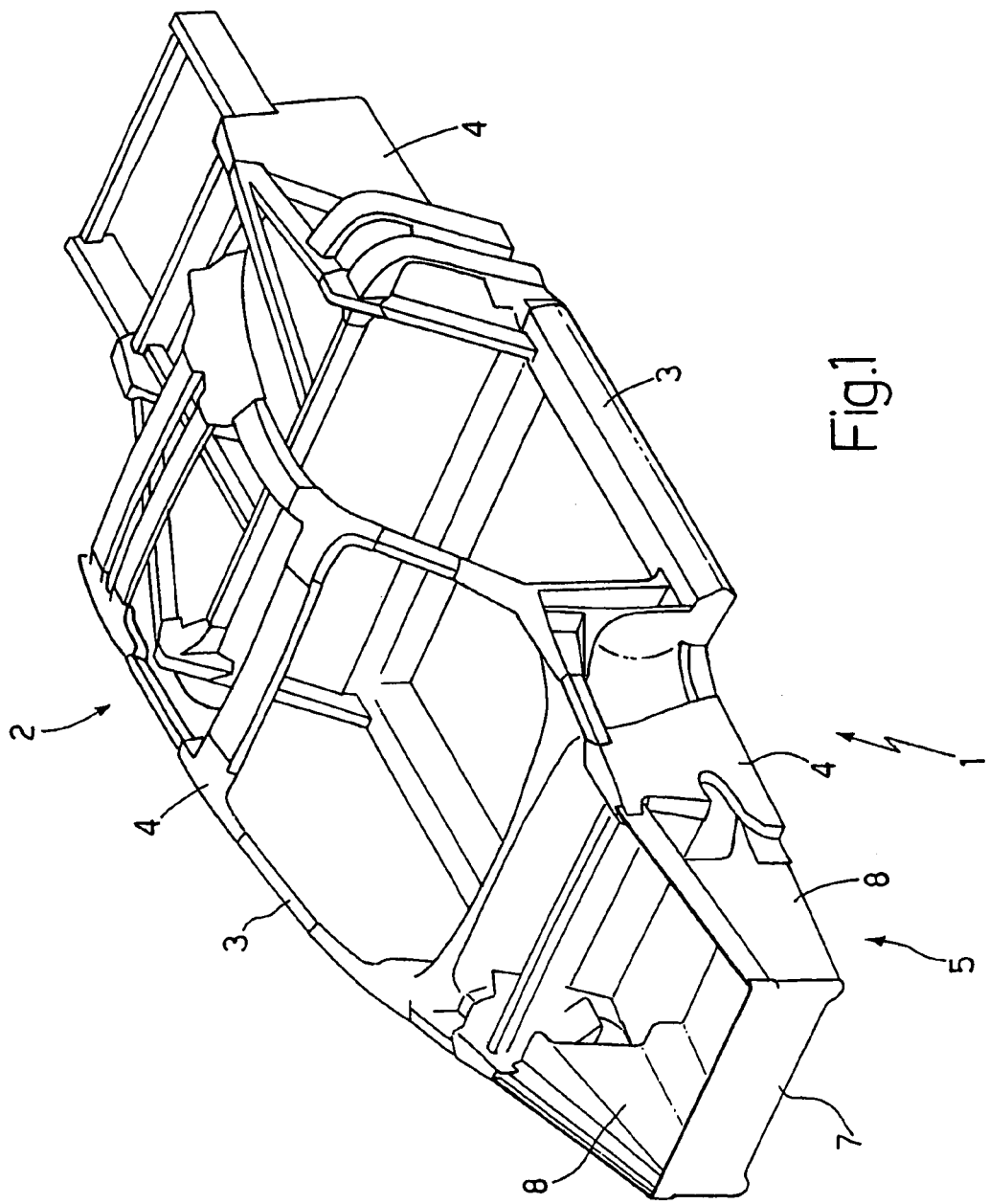
FIG. 1 shows a schematic view in perspective of a frame in accordance with the present invention.

Number 1 in FIG. 1 indicates a car frame comprising a central body 2 defining the passenger compartment of the car. The central body 2 is preferably made of aluminum by welding together a number of component parts, and in particular comprises a number of extruded, constant-section, straight bars 3 welded to one another at structural nodes defined by connecting bodies 4. Each connecting body 4 comprises a number of pockets (not shown in detail) for housing the ends of corresponding straight bars 3. More specifically, four connecting bodies 4 (two front connecting bodies 4 and two rear connecting bodies 4) are provided at the suspension attachment points.

A front body 5 and a floor panel 6, both made of composite material fibre using RTM (Resin Transfer Molding) technology, are bolted to central body 2, and may be made of carbon fibre, KevIan® fibre, or a mixture of carbon/Kevlart® fibre and glass fibre. Glass fibre is obviously used to reduce manufacturing cost, compatibly with the desired structural characteristics.

Figure 2:
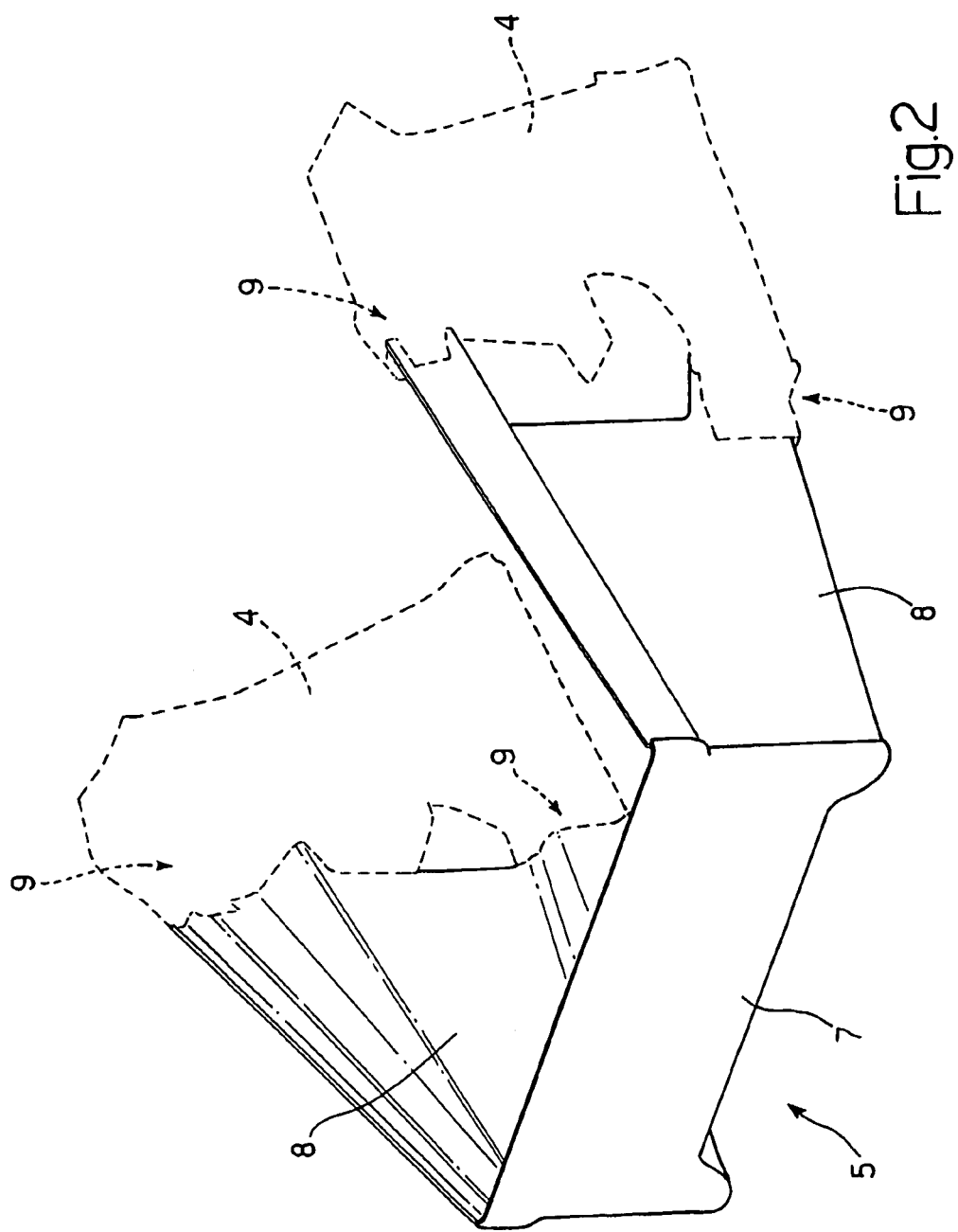
FIGS. 2 and 3 show two larger-scale views in perspective of a front body of the FIG. 1 frame.
Figure 3:
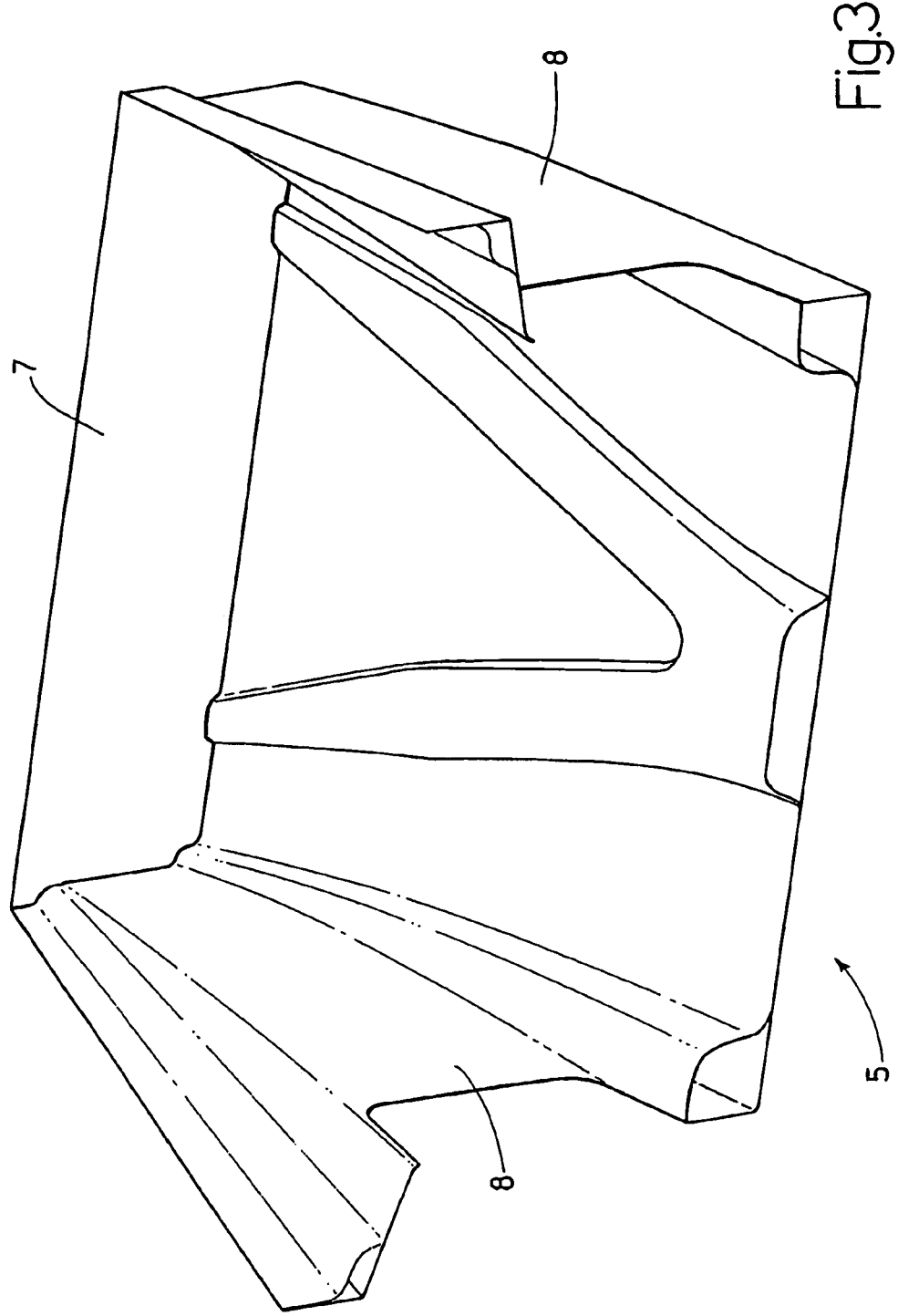

As shown in FIG. 2, front body 5 is monolithic, and comprises a front panel 7 positioned crosswise to frame 1 and from which extend two lateral panels 8 positioned longitudinally with respect to frame 1. Lateral panels 8 are positioned with their ends resting against central body 2, which preferably comprises a number of seats 9 (FIG. 2) into which the ends of respective end portions of lateral panels 8 fit. The end portions of lateral panels 8 have a number of through holes (not shown in detail) through which respective screws or other fasteners (not shown in detail) are inserted and fixed to central body 2. More specifically, lateral panels 8 are positioned with their ends resting against the two front connecting bodies 4 of central body 2, i.e. the two connecting bodies 4 at the front suspension attachment points, which connecting bodies 4 have seats 9.

Figure 4:
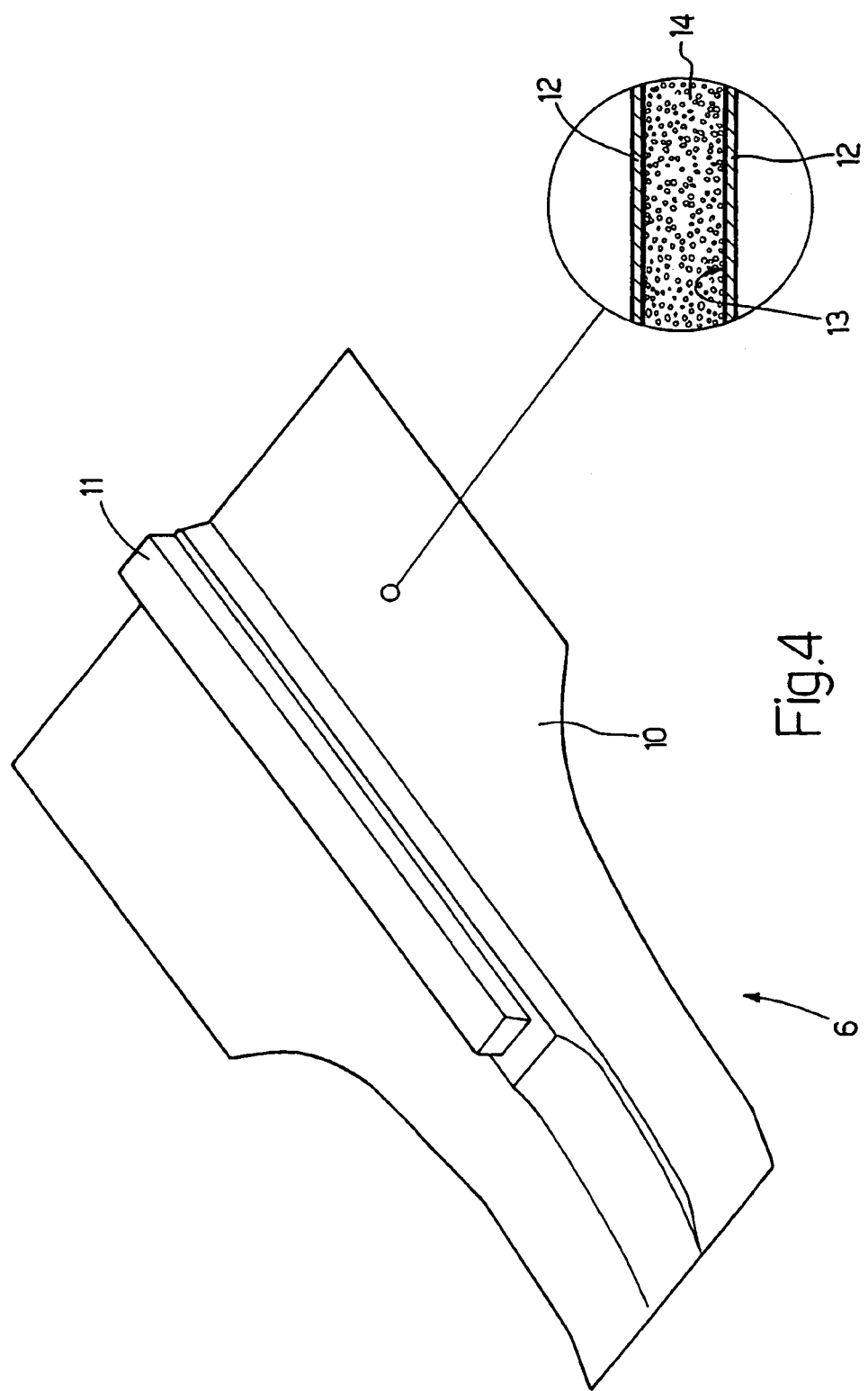
FIG. 4 shows a view in perspective of a floor panel of the FIG. 1 frame.

As shown in FIG. 4, floor panel 6 is monolithic, and comprises a flat base member 10, along the centre line of which a tubular, rectangular-section body 11 extends upwards. Base member 10 of floor panel 6 has top and bottom skin members 12 made of composite material fibre and separated to define in between a cavity 13 filled with soundproofing foam 14 or another soundproofing material. Floor panel 6 preferably comprises a number of through holes (not shown in detail) through which respective screws (not shown in detail) are inserted and fixed to central body 2.

Floor panel 6 may be assembled separately to the central body 2, or, alternatively, may be bolted to front body 5 before being bolted to central body 2.

In a further embodiment, central body 2 may also comprise parts made of composite material fibre, or may be made entirely of composite material fibre.

Front body 5 and floor panel 6 provide for a high degree of crash and static and dynamic structural resistance. They also can be disassembled easily, are highly modular, and are less expensive and easier to produce, even in relatively small numbers (up to 30 parts a day).

The invention claimed is:

1. A frame member for a car, said frame member comprising:
 a central body member comprising the passenger compartment of the car;
 a front body member connected to said central body member; and
 a floor panel member connected to said central body member;
 said front body member being a monolithic substantially U-shaped structure with a front portion and pair of lateral side portions;
 said front body member being made of a non-metallic composite material;
 said floor panel member being a monolithic structure and being made of a non-metallic composite material;
 said floor panel member having a base portion comprising a pair of skin members separated by a cavity therebetween; and
 soundproofing material positioned in said cavity;
 wherein said frame member comprises modular components which can be selectively assembled and disassembled.

2. The frame member as claimed in claim 1, wherein the floor panel member is connected separately to the front body member.

3. The frame member as claimed in claim 1, whereas the floor panel member is bolted to the front body member.

4. The frame member as claimed in claim 3, wherein the front body member is bolted to the central body member, and wherein the floor panel member and the front body member are bolted to each other before being bolted to the central body member.

5. The frame member as claimed in claim 1 further comprising through-holes formed in the central body member, front body member and floor panel member to facilitate connecting said members together with fastener members.

6. The frame member as claimed in claim 1 further comprising seat members in said central body member wherein for attachment, ends of said lateral side portions are mated with and positioned in said seat members.

7. The frame member as claimed in claim 1, wherein the floor panel member comprises a number of through holes through which fasteners are inserted and fixed to the central body member.

8. The frame member as claimed in claim 1, wherein said portion of said body member is positioned crosswise to the frame member and said two lateral side portions extend longitudinally with respect to said frame member.

9. The frame member as claimed in claim 1, wherein the central body comprises a number of seats into which the ends of respective end portions of the lateral side portions fit, and said end portions of the lateral side portions have a number of through holes through which respective fasteners are inserted and fixed to the central body member.

10. The frame member as claimed in claim 8, wherein the central body member comprises a number of metal members welded to one another, and comprises a number of extruded, constant-section, straight bar members welded to one another at structural nodes defined by connecting bodies, each connecting body comprising a number of pockets for housing the ends of corresponding straight bar members, and said front body member is connected to two front connecting bodies of the central body member.

11. The frame member as claimed in claim 10, wherein the central body member is made substantially of aluminium material.

12. The frame member as claimed in claim 1, wherein the non-metallic composite material comprises a mixture of carbon or Kevlar fibre and glass fibre.

13. The frame member as claimed in claim 1 wherein said base portion is positioned substantially centered on said floor panel member and said base portion comprises a tubular, rectangular-sectioned body member.

14. The frame member as claimed in claim 1 wherein said composite material comprises RTM material.

* * * * *